United States Patent Office 3,459,853
Patented Aug. 5, 1969

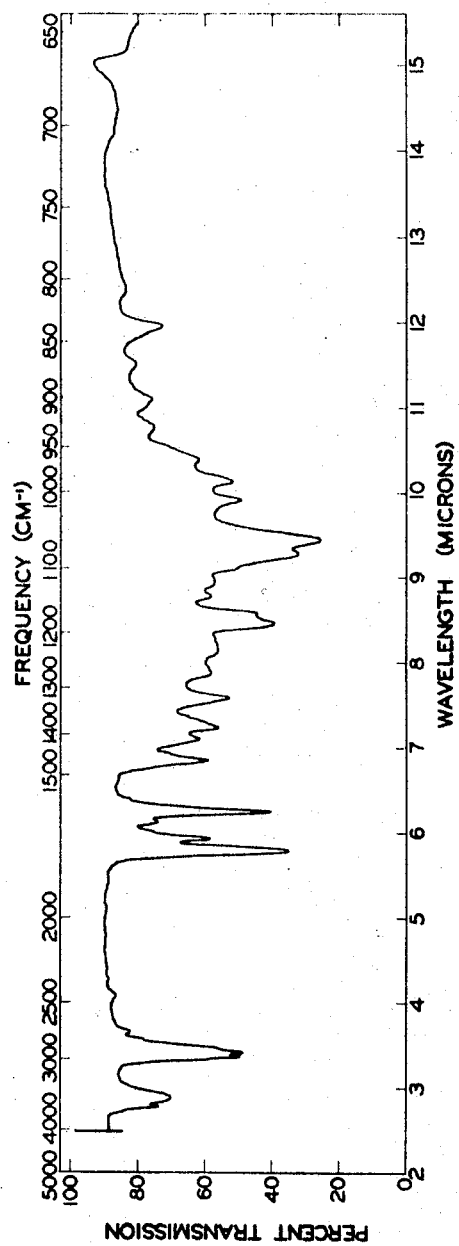

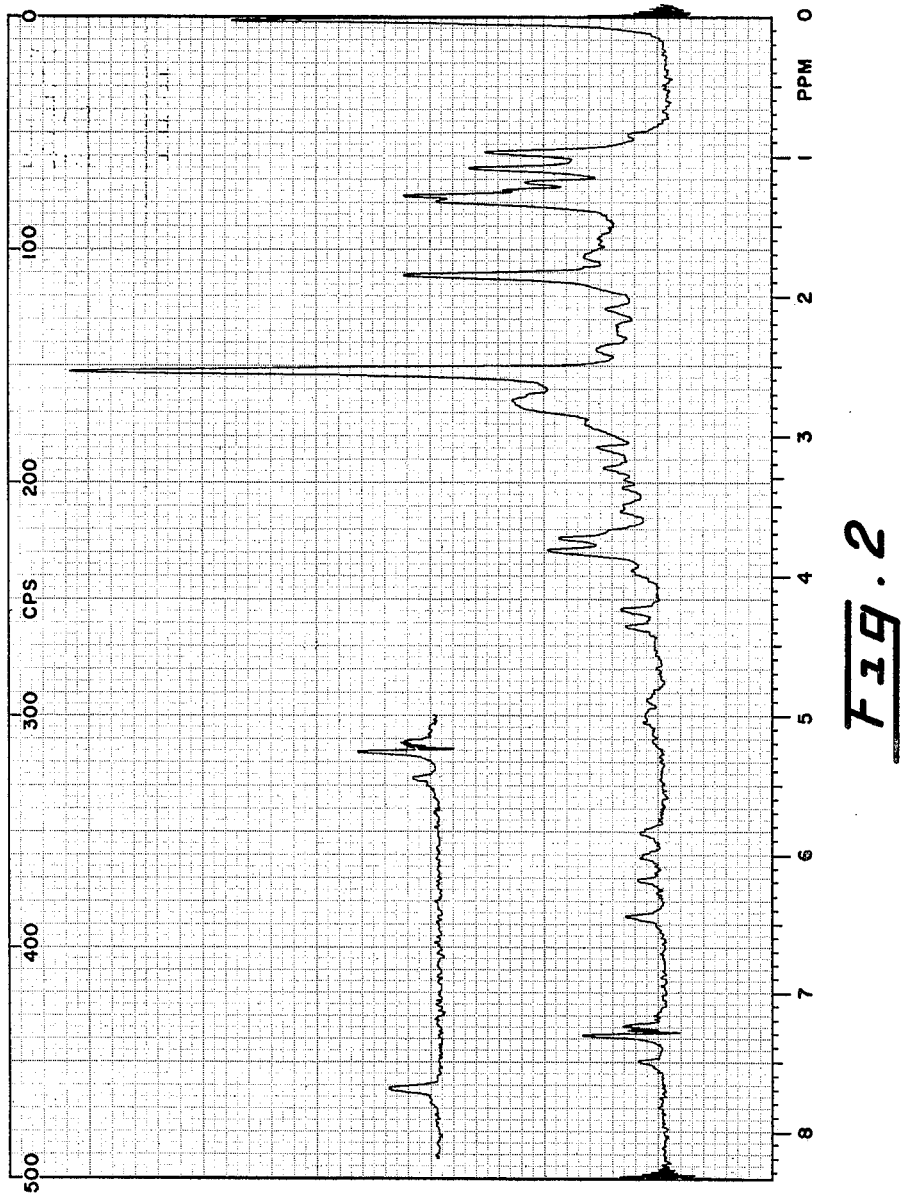

3,459,853
O-MYCAMINOSYL TYLONOLIDE AND A PROCESS FOR THE PREPARATION THEREOF
Marvin Gorman and Robert B. Morin, Indianapolis, Ind., assignors to Eli Lilly and Company, Indianapolis, Ind., a corporation of Indiana
Filed Aug. 5, 1964, Ser. No. 387,692
Int. Cl. A61k 21/00; C07g 11/00
U.S. Cl. 424—121
6 Claims

ABSTRACT OF THE DISCLOSURE

O-mycaminosyl tylonolide and the dihydro derivative thereof, prepared by controlled acid hydrolysis of tylosin, desmycosin, macrocin and lactenocin and the dihydro derivatives thereof.

---

This invention relates to novel antibiotic substances. More particularly, the invention relates to an antibiotic substance denominated herein as O-mycaminosyl tylonolide and to certain derivatives thereof, as well as methods for the preparation of such substances.

Tylosin is an antibiotic produced by certain strains of *Streptomyces fradiae* and has been described by Hamill et al. in Antibiotics and Chemotherapy, 11, 328 (1961). Prior to the completion of our invention, tylosin was thought to be a macrolide antibiotic in which a neutral sugar mycarose, having the formula

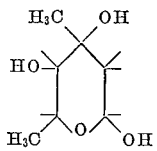

and an amino sugar mycaminose, having the formula

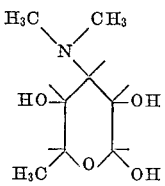

were attached to a many-membered lactone ring. It has now been discovered that yet a third sugar, having the formula

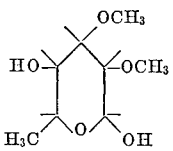

is attached to this ring. This sugar, like mycarose, is a neutral sugar and has been identified as mycinose, recently described and characterized by Dion et al., J. Am. Chem. Soc., 84, 880 (1962).

It has been known that hydrolysis of tylosin under mildly acidic conditions splits off the neutral sugar mycarose and produces a new antibiotic substance, desmycosin. It has been further known that vigorous treatment of either tylosin or desmycosin with acid results in the production of the amino sugar mycaminose with concomitant destruction of the remaining portions of the antibiotic molecule.

It is an object of the present invention to provide a new antibiotic substance, known as O-mycaminosyl tylonolide, in which only the amino sugar mycaminose is attached to the lactone ring. A further object of the invention is to provide methods for producing the said new antibiotic substance from previously known and available antibiotic materials. Still another object of the invention is to provide methods for the preparation of the dihydro derivative of O-mycaminosyl tylonolide. Other objects of the invention will be apparent from the description of the invention provided hereinafter.

The present invention provides the new antibiotic substance, O-mycaminosyl tylonolide by the aqueous hydrolysis, under controlled acidic conditions, of desmycosin, or tylosin. During such treatment of tylosin, the neutral sugars mycarose and mycinose are split off; when desmycosin is subjected to similar treatment, the neutral sugar mycinose is split off.

In either case, the resulting product preserves intact the large-membered lactone ring found in both tylosin and desmycosin. Attached to this ring, in an as yet undetermined fashion, is the amino sugar mycaminose. The designation "tylonolide" has been assigned to the lactone ring fragment of tylosin without any attached sugars. Hence, the antibiotic of the present invention, comprising a mycaminose residue attached to the said lactone ring fragment, is logically named O-mycaminosyl tylonolide.

The present invention, however, is not limited to the production of O-mycaminosyl tylonolide from desmycosin and tylosin, since, obviously, any substance which contains the basic O-mycaminosyl tylonolide residue to which are attached sugars which can be split off by hydrolysis can serve as a suitable starting material. Thus, for example, the antibiotics macrocin and lactenocin, described by Hamill et al. in copending application Ser. No. 210,904, filed July 19, 1962, now Patent No. 3,326,759 can also be employed as suitable starting materials for the production of O-mycaminosyl tylonolide by the process of this invention.

Similarly, O-mycaminosyl tylonolide derivatives in which the lactone portion of the molecule has been modified can be prepared from the correspondingly modified derivatives of tylosin, desmycosin, macrocin, lactenocin and the like. Thus, for example, dihydro-O-mycaminosyl tylonolide can be prepared by the process of this invention from dihydrotylosin which is readily obtainable from tylosin by chemical reduction, as for example with sodium borohydride, or by microbiological conversion.

Although the process of the present invention permits considerable variation in temperature and reaction time, the pH at which the hydrolysis is carried out is a critical factor. In general, it can be said that in order to produce a significant amount of the desired product, the pH at which the reaction is carried out must be between about pH 1.5 and 2.5, preferably about pH 2. At lower pH, mycaminose is split off with consequent destruction of antibiotic activity. When the pH exceeds about 2.5, hydrolysis to the desired product occurs so slowly that, for practical purposes, the process is inoperative.

As is usually the case, the time and temperature variables are interdependent, higher temperatures permitting shorter reaction times. In general, reaction temperatures above about 70° C. should be employed in order to permit the hydrolysis to take place in a reasonable time, with temperatures between about 100° C. and the reflux temperature of the reaction mixture being preferred.

The new antibiotic substance, O-mycaminosyl tylonolide, provided by this invention, hereinafter designated OMT, for short, is a basic substance which softens at about 113° C. and melts at about 115–118° C. It is soluble in certain organic solvents such as chloroform, benzene, acetone, methanol, and the like. It is soluble to a lesser degree in water in organic solvents such as diethyl ether.

In methanol solution, at a temperature of 25° C., the specific rotation for sodium D light of OMT is +8.11° when the concentration of OMT is 0.863 percent on a weight per volume basis.

The infrared absorption curve of a chloroform solution of OMT is shown in FIGURE 1. The following absorption maxima are observed in the region from 2–15 microns: 2.78, 2.89, 3.37, 3.42, 3.68, 4.11, 5.82, 5.96, 6.15, 6.28, 6.87, 7.12, 7.25, 7.59, 7.88, 8.13, 8.46, 8.60, 8.79, 9.30, 9.47, 9.93, 10.16, 10.43, 10.79, 11.12, 11.54, and 11.97 microns.

The ultraviolet absorption spectrum of OMT in 95 percent aqueous ethanol solution shows an intense absorption maximum at about 284 m$\mu$ with an absorptivity value of $$E_{1\ cm.}^{1\%} = 315$$

The nuclear magnetic resonance spectrum of OMT is shown in FIGURE 2.

Electrometric titration of OMT in 66 percent aqueous dimethylformamide indicates the presence of one titratable group of pK′a 8.0.

Analytical and physicochemical data support the inference that OMT has a structure like that of desmycosin with the neutral sugar mycinose removed. The best available evidence suggests a molecule having an empirical formula $C_{30}H_{49}NO_{10}$. Microanalytical data are in good agreement with this structure, as indicated in the following figures.

*Analysis.*—Calculated for $C_{30}H_{49}NO_{10}$ (percent): C, 61.73; H, 8.46; N, 2.40. Found (percent): C, 61.73; H, 8.78; N, 2.25.

O-mycaminosyl tylonolide is effective to inhibit the growth of a wide variety of bacterial microorganisms, including *Staphylococcus aureus* 3055, *Bacillus subtilis*, *Mycobacterium avium*, *Streptococcus faecalis*, *Lactobacillus casei*, *Leuconostoc citrovorum*, and others. *Streptococcus pyogenes* infections in mice have been found to be controlled by two subcutaneous doses of OMT at a level of 8.3 mg./kg. The oral toxicity of OMT in mice expressed as $LD_{50}$ has been found to be 420 mg./kg.

The examples which follow illustrate some of the methods which can be employed in the practice of this invention. It will be apparent from the foregoing description that many modifications are possible without departing from the spirit of the invention.

EXAMPLE 1

A solution of 5 g. of desmycosin in about 500 ml. of pH 2 aqueous sulfuric acid is heated at reflux for about 60 hours and is then allowed to stand at room temperature for three days. The resulting brown reaction mixture is extracted three times with 200 ml. portions of methylene chloride and the organic phase is discarded. The pH of the clear, colorless, aqueous solution which remains is adjusted to pH 6 with aqueous ammonium hydroxide solution and the solution is again extracted with methylene chloride to remove unreacted desmycosin. The pH of the aqueous phase is further adjusted to pH 9 and the extraction with methylene chloride is repeated. The methylene chloride extracts are dried and evaporated to yield about 3.3 g. of O-mycaminosyl tylonolide which melts at about 115–118° C.

EXAMPLE 2

A solution of 5 g. of tylosin in about 200 ml. of pH 2 aqueous sulfuric acid is heated under reflux for about 48 hours. The reaction mixture is cooled and subjected to the isolation procedure described in Example 1. The OMT so obtained is identical to that obtained from desmycosin.

EXAMPLE 3

Dihydrotylosin is prepared from tylosin by reduction with one equivalent of sodium borohydride in ethanol. The product so obtained is employed to prepare a solution containing 2 g. of dihydrotylosin in 200 ml. of pH 2 aqueous sulfuric acid. This solution is then heated under reflux of about 60 hours and carried thru the isolation and purification procedure described in Example 1. The nuclear magnetic resonance spectrum of the product indicates a high degree of purity for the dihydro-O-mycaminosyl tylonolide so obtained.

We claim:

1. O-mycaminosyl tylonolide, a white basic substance which melts at about 115–118° C.; which is soluble in chloroform, benzene, acetone, and methanol, and slightly soluble in ether and water; which is weakly basic, having one titratable group with a pK′a value of 8.0 as determined by electrometric titration in 66 percent aqueous dimethylformamide; which has the approximate composition of 61.73 percent carbon, 8.78 percent hydrogen, 2.25 percent nitrogen, and 27.24 percent oxygen (by difference), and an empirical formula approximating $C_{30}H_{49}NO_{10}$; which, in 95 percent aqueous ethanol, has an ultraviolet absorption spectrum showing an intense absorption maximum at about 284 m$\mu$ with an absorptivity value of $$E_{1\ cm.}^{1\%} = 315$$

which, in chloroform solution, has the following distinguishable bands in its infrared absorption spectrum: 2.78, 2.89, 3.37, 3.42, 3.68, 4.11, 5.82, 5.96, 6.15, 6.28, 6.87, 7.12, 7.25, 7.59, 7.88, 8.13, 8.46, 8.60, 8.79, 9.30, 9.47, 9.93, 10.16, 10.43, 10.79, 11.12, 11.54 and 11.97 microns; and which has a specific rotation for sodium D light of 8.11° at a temperature of 25° C. as an 0.863 percent solution in methanol.

2. The process of preparing O-mycaminosyl tylonolide as claimed in claim 1 which comprises heating an aqueous solution of a substance selected from the group consisting of tylosin, desmycosin, macrocin, and lactenocin at a temperature above about 70° C. at a pH between about 1.5 and pH 2.5.

3. The process of preparing O-mycaminosyl tylonolide as claimed in claim 1 which comprises heating at about pH 2 an aqueous solution of the antibiotic tylosin at a temperature above about 70° C.

4. The process of preparing O-mycaminosyl tylonolide as claimed in claim 1 which comprises heating at about pH 2 an aqueous solution of the antibiotic desmycosin at a temperature above about 70° C.

5. The process of preparing O-mycaminosyl tylonolide as claimed in claim 1 which comprises heating at about pH 2 an aqueous solution of the antibiotic macrocin at a temperature above about 70° C.

6. The process of preparing O-mycaminosyl tylonolide as claimed in claim 1 which comprises heating at about pH 2 an aqueous solution of the antibiotic lactenocin at a temperature above about 70° C.

References Cited

UNITED STATES PATENTS 3,178,341   4/1965   Hamill et al. _____ 167—65

ALBERT T. MEYERS, Primary Examiner

D. M. STEPHENS, Assistant Examiner

424—123